US012640862B2

(12) United States Patent
Chu et al.

(10) Patent No.: US 12,640,862 B2
(45) Date of Patent: May 26, 2026

(54) PRIMARY AND NON-PRIMARY SUBCHANNELS IN A BASIC SERVICE SET OF A WIRELESS NETWORK

(71) Applicant: NXP USA, Inc., Austin, TX (US)

(72) Inventors: Liwen Chu, San Ramon, CA (US);
Kiseon Ryu, San Diego, CA (US);
Hongyuan Zhang, Fremont, CA (US);
Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 289 days.

(21) Appl. No.: 18/370,790

(22) Filed: Sep. 20, 2023

(65) Prior Publication Data

US 2024/0097838 A1     Mar. 21, 2024

Related U.S. Application Data

(60) Provisional application No. 63/378,317, filed on Oct. 4, 2022, provisional application No. 63/376,362, filed on Sep. 20, 2022.

(51) Int. Cl.
H04L 5/00          (2006.01)
H04W 74/0816     (2024.01)

(52) U.S. Cl.
CPC ....... H04L 5/0037 (2013.01); H04W 74/0816 (2013.01)

(58) Field of Classification Search
CPC .......................... H04L 5/0037; H04W 74/0816
See application file for complete search history.

(56) References Cited

U.S. PATENT DOCUMENTS

| | | | |
|---|---|---|---|
| 11,457,448 B2 | 9/2022 | Chu et al. | |
| 2016/0330753 A1 * | 11/2016 | Jauh | H04W 28/065 |
| 2017/0188336 A1 * | 6/2017 | Ahn | H04W 72/04 |
| 2017/0338935 A1 * | 11/2017 | Ahn | H04W 72/0446 |

FOREIGN PATENT DOCUMENTS

| | | | | |
|---|---|---|---|---|
| WO | WO-2016187853 A1 * | 12/2016 | ........ | H04W 74/0858 |
| WO | WO-2017161361 A2 * | 9/2017 | ........... | H04W 24/08 |
| WO | WO-2018145348 A9 * | 6/2019 | ........... | H04W 74/08 |

OTHER PUBLICATIONS

Lu, Kaiying et al. "Partial Bandwidth Transmission Opportunities in EHT"; Media Tech; IEEE 802.11-20/0429r0; (Mar. 2020), 21 pgs.
Verma, Sindhu et al. "Proposals on Unused Badwidth Utilizations"; IEEE 802.11-20/0363r3; (Aug. 26, 2020), 18 pgs.

* cited by examiner

*Primary Examiner* — Ajay Cattungal

(57) ABSTRACT

Embodiments of a method and apparatus for wireless communications are disclosed. In an embodiment, a method includes selecting backoff 20 MHz channels of an operating channel bandwidth (BW) of a Basic Service Set (BSS), and announcing to a second wireless device the operating channel BW of the BSS for use in communicating between the wireless device and the second wireless device, subchannels of the operating channel bandwidth, and backoff 20 MHz channels of each subchannel, wherein one subchannel is a primary subchannel and one subchannel is a non-primary subchannel. A data unit is transmitted to the second wireless device in a backoff 20 MHz channel of the non-primary subchannel.

19 Claims, 7 Drawing Sheets

302

80MHz CHANNEL 4
(SUBCHANNEL 4)
310

80MHz CHANNEL 3
(SUBCHANNEL 3)
308

80MHz CHANNEL 2
(SUBCHANNEL 2)
306

80MHz CHANNEL 1
(SUBCHANNEL 1)
(PRIMARY
80MHz CHANNEL)
304

BACKOFF 20MHz
CHANNEL 4
320

BACKOFF 20MHz
CHANNEL 3
318

316
BACKOFF 20MHz
CHANNEL 2

PRIMARY 20MHz
CHANNEL
314

BSS
OPERATING CHANNEL

402

160MHz CHANNEL 2
(SUBCHANNEL 2)
406

160MHz CHANNEL 1
(SUBCHANNEL 1)
(PRIMARY
160MHz CHANNEL)
404

BACKOFF 20MHz
CHANNEL 2
416

PRIMARY 20MHz
CHANNEL
414

BSS
OPERATING CHANNEL

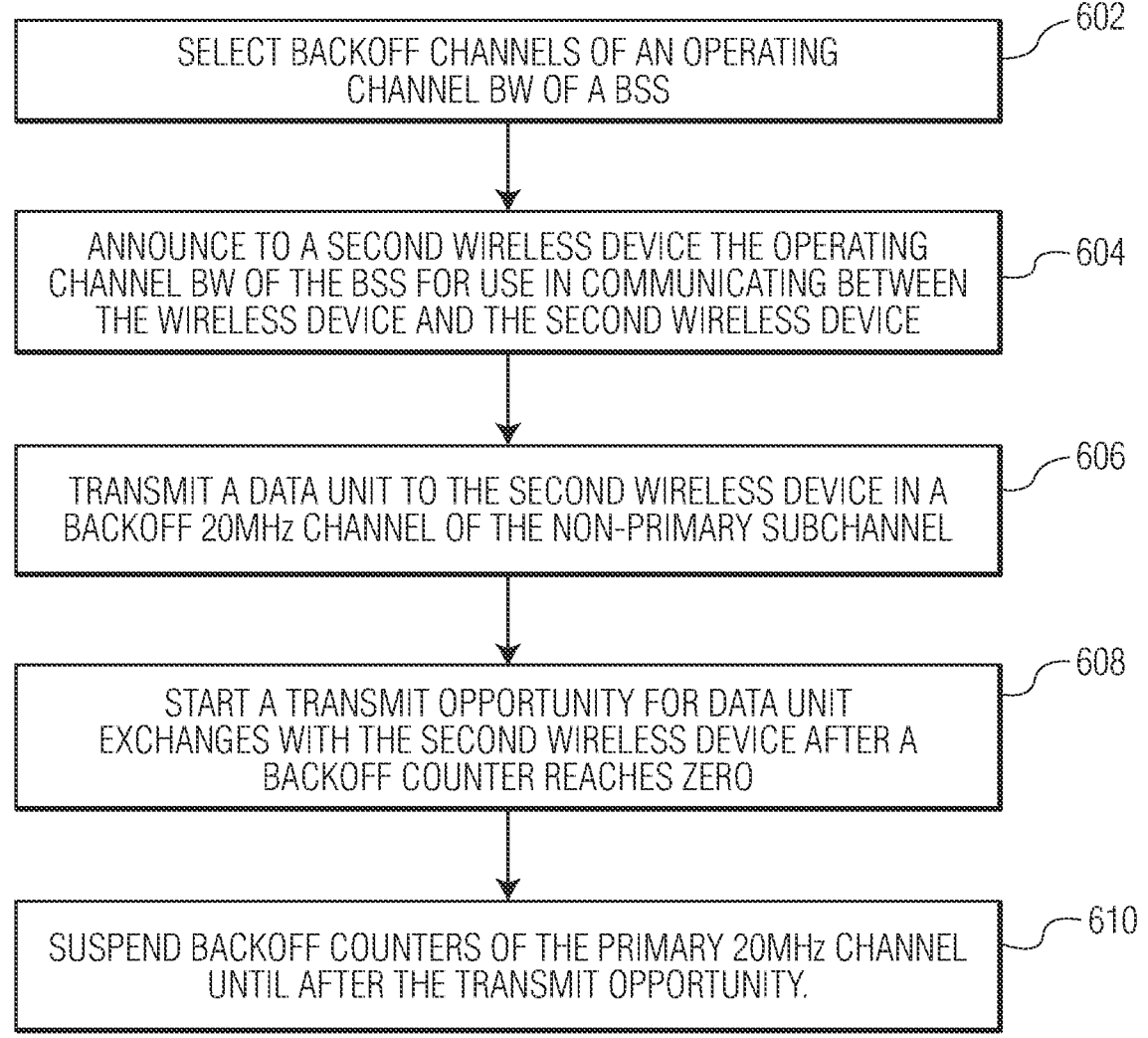

SELECT BACKOFF CHANNELS OF AN OPERATING CHANNEL BW OF A BSS — 602

ANNOUNCE TO A SECOND WIRELESS DEVICE THE OPERATING CHANNEL BW OF THE BSS FOR USE IN COMMUNICATING BETWEEN THE WIRELESS DEVICE AND THE SECOND WIRELESS DEVICE — 604

TRANSMIT A DATA UNIT TO THE SECOND WIRELESS DEVICE IN A BACKOFF 20MHz CHANNEL OF THE NON-PRIMARY SUBCHANNEL — 606

START A TRANSMIT OPPORTUNITY FOR DATA UNIT EXCHANGES WITH THE SECOND WIRELESS DEVICE AFTER A BACKOFF COUNTER REACHES ZERO — 608

SUSPEND BACKOFF COUNTERS OF THE PRIMARY 20MHz CHANNEL UNTIL AFTER THE TRANSMIT OPPORTUNITY. — 610

FIG. 6

PRIMARY AND NON-PRIMARY SUBCHANNELS IN A BASIC SERVICE SET OF A WIRELESS NETWORK

CROSS-REFERENCE TO RELATED APPLICATIONS

This application is entitled to the benefit of U.S. Provisional Patent Application Ser. No. 63/376,362, filed on Sep. 20, 2022 and of U.S. Provisional Patent Application Ser. No. 63/378,317, filed on Oct. 4, 2022, which are incorporated by reference herein.

BACKGROUND

Wireless communications devices, e.g., access points (APs) or non-AP devices can transmit various types of information using different transmission techniques. For example, various applications, such as, Internet of Things (IoT) applications can conduct wireless local area network (WLAN) communications, for example, based on Institute of Electrical and Electronics Engineers (IEEE) 802.11 family of standards (e.g., Wi-Fi standards). Some applications, for example, video teleconferencing, streaming entertainment, high definition (HD) video surveillance applications, outdoor video sharing applications, etc., require relatively high system throughput. New wider channels and multiple subchannels allow for more data to be transmitted.

SUMMARY

Embodiments of primary and non-primary subchannels in a BSS of a wireless network are disclosed. In an embodiment, a wireless device includes a controller to select backoff channels of an operating channel bandwidth (BW) of a Basic Service Set (BSS) and a wireless transceiver configured to announce to a second wireless device the operating channel BW of the BSS for use in communicating between the wireless device and the second wireless device, subchannels of the operating channel bandwidth, and backoff 20 MHz channels of each subchannel, wherein one subchannel is a primary subchannel and one subchannel is a non-primary subchannel. The wireless transceiver is configured to transmit a data unit to the second wireless device in a backoff 20 MHz channel of the non-primary subchannel.

In an embodiment, the wireless transceiver is configured to announce using a management frame.

In an embodiment, the management frame is at least one of a Beacon Frame, a Probe Response Frame, and an Association Response Frame.

In an embodiment, wherein the Beacon Frame is in a backoff 20 MHz channel of the non-primary subchannel.

In an embodiment, the wireless transceiver is configured to start a transmit opportunity for data unit exchanges with the second wireless device after a backoff counter reaches zero.

In an embodiment, the controller is configured to suspend backoff counters of the primary 20 MHz channel until after the transmit opportunity.

In an embodiment, the wireless transceiver is configured to send a request to send message in the non-primary subchannel including a backoff 20 MHz channel of the non-primary subchannel, to receive a clear to send message in the backoff 20 MHz channel, and to send a data unit having a bandwidth within the non-primary subchannel.

In an embodiment, the wireless transceiver is configured to send a multi-user request to send message in the non-primary subchannel including a backoff 20 MHz channel of the non-primary subchannel to multiple wireless devices, to receive a clear to send message in the backoff 20 MHz channel from multiple users, and to send a data unit having a bandwidth within the non-primary subchannel.

In an embodiment, the wireless transceiver is configured to send a request to send message in the backoff 20 MHz channel of the non-primary subchannel, to receive a clear to send message in the non-primary subchannel, and to send a data unit having a bandwidth greater than the non-primary subchannel.

In an embodiment, the wireless transceiver is configured to detect whether the primary 20 MHz channel is busy and to transmit the data unit in the backoff 20 MHz channel of the non-primary subchannel in response to the primary 20 MHz channel being busy.

In an embodiment, the detecting whether the primary 20 MHz channel is busy includes waiting for an interframe space and determining that channel state information indicates that the backoff 20 MHz channel is idle.

In an embodiment, the wireless transceiver is configured to transmit the data unit in multiple backoff 20 MHz channels of the non-primary subchannel.

In an embodiment, the wireless transceiver is configured to send a message to the second wireless device to park in the non-primary subchannel that includes the backoff 20 MHz channel.

In an embodiment, the wireless transceiver is configured to assign the backoff 20 MHz channel as a dummy primary 20 MHz channel for use as a primary 20 MHz channel in the non-primary subchannel by the second wireless device.

In an embodiment, the wireless transceiver is configured to send a data unit in the non-primary subchannel in response to sending the message to park in the non-primary subchannel.

In an embodiment, the controller is configured to allocate resource units to the second wireless device in the non-primary subchannel and wherein the wireless transceiver is configured to assign resource units.

In an embodiment, the resource units are assigned by sending a Trigger Frame.

In an embodiment, a wireless device includes a controller to store backoff 20 MHz channels of an operating channel BW of a BSS announced by a second wireless device, and a wireless transceiver configured to receive an announcement from the second wireless device of the operating channel BW of the BSS for use in communicating between the wireless device and the second wireless device, subchannels of the operating channel bandwidth, and backoff 20 MHz channels of each subchannel, wherein one subchannel is a primary subchannel and one subchannel is a non-primary subchannel. The wireless transceiver is configured to transmit a data unit to the second wireless device in a backoff 20 MHz channel of the non-primary subchannel.

In an embodiment, a method for wireless communications involves selecting backoff 20 MHz channels of an operating channel bandwidth (BW) of a Basic Service Set (BSS), and announcing to a second wireless device the operating channel BW of the BSS for use in communicating between the wireless device and the second wireless device, subchannels of the operating channel bandwidth, and backoff 20 MHz channels of each subchannel, wherein one subchannel is a primary subchannel and one subchannel is a non-primary subchannel. A data unit is transmitted to the second wireless device in a backoff 20 MHz channel of the non-primary subchannel.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6 is a process flow diagram of a method for wireless communications in accordance with an embodiment of the invention.

DETAILED DESCRIPTION

Figure 1:
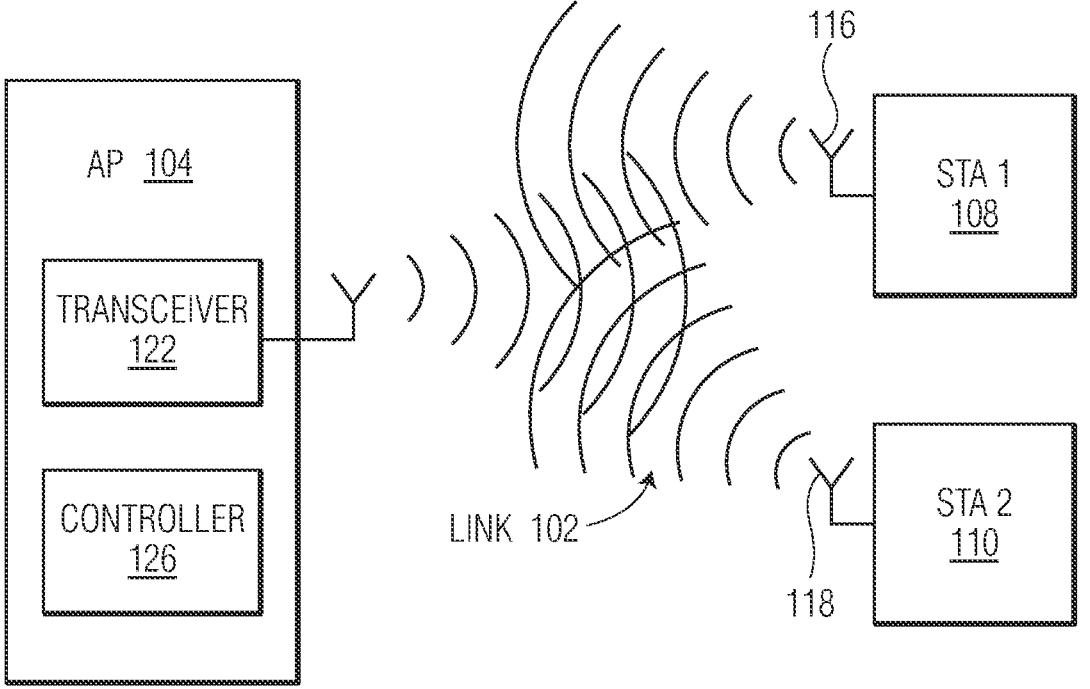
FIG. 1 depicts a wireless communications system with multiple STAs and multiple subchannel transmission capabilities in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

An Access Point (AP) can allocate its BSS operating channel to multiple subchannels (e.g., each 80 MHz subchannel of a 160 MHz BSS channel, each 80 MHz subchannel of a 320 MHz BSS channel or each 160 MHz subchannel of a 320 MHz BSS channel), where each subchannel includes one backoff 20 MHz channel. The subchannel with the primary 20 MHz channel as the special backoff 20 MHz channel is the primary subchannel and a subchannel without the primary 20 MHz channel is a non-primary subchannel. In the examples, herein the 20 MHz backoff channel of each of the different multiple subchannels is not punctured. If the primary subchannel is busy because of a TXOP of a neighbor BSS, the AP and its associated STAs switch to a non-primary subchannel and do frame exchanges on the non-primary subchannel after the backoff on the backoff 20 MHz channel of the non-primary 20 MHz channel. At the end of the neighbor BSS's TXOP, the AP and its associated STAs switch back to the primary subchannel to do the frame exchanges after the backoff procedure in the primary 20 MHz channel. Such a switch from one subchannel to another subchannel is a dynamic subchannel switch.

FIG. 1 depicts a communications system 100 that is used for wireless (e.g., WiFi) communications. In the embodiment depicted in FIG. 1, the communications system includes one AP, and non-AP STAs, which are implemented as STA 108 and STA 110. The AP 104 is implemented as a transceiver 122 with an antenna 124, and a controller 126 with programming instructions and memory. The communications system can be used in various applications, such as industrial applications, medical applications, computer applications, and/or consumer or enterprise applications. In some embodiments, the communications system is a wireless communications system, such as a wireless communications system compatible with an IEEE 802.11 protocol. For example, the communications system may be a wireless communications system compatible with the IEEE 802.11ax protocol or another protocol. Although the depicted communications system 100 is shown in FIG. 1 with certain components and described with certain functionality herein, other embodiments of the communications system may include fewer or more components to implement the same, less, or more functionality. For example, in some embodiments, the communications system includes multiple APs with one STA, or multiple APs with more than one STA. In another example, although the communications system is shown in FIG. 1 as being connected in a certain topology, the network topology of the communications system is not limited to the topology shown in FIG. 1.

In the embodiment depicted in FIG. 1, the AP 104 has a transceiver 122 to maintain a radio link 102 through an antenna 124 coupled to the transceiver 122. In some embodiments, the AP 104 implements upper layer Media Access Control (MAC) functionalities (e.g., beacon acknowledgement establishment, reordering of frames, etc.) and lower layer MAC functionalities (e.g., backoff, frame transmission, frame reception, etc.). The AP 104 may be implemented in hardware (e.g., circuits), software, firmware, or a combination thereof. The AP 104 may be fully or partially implemented as an integrated circuit (IC) device. In some embodiments, the AP 104 is a wireless AP compatible with at least one WLAN communications protocol (e.g., at least one IEEE 802.11 protocol). In some embodiments, an AP is a wireless AP that connects to a network 112, e.g., a local area network (LAN) and/or to a backbone network (e.g., the Internet) through a wired connection and that wirelessly connects to wireless stations (STAs), e.g., STA 1 108, STA2 112 for example, through one or more WLAN communications protocols, such as the IEEE 802.11 protocol. In some embodiments, an AP includes at least one controller 126 operably connected to the transceiver 122. In some embodiments, the transceiver 122 includes a physical layer (PHY) device. The at least one controller 126 may be configured to control the transceiver to process received packets through the antenna 124. In some embodiments, the at least one controller is implemented within a processor, such as a microcontroller, a host processor, a host, a digital signal processor (DSP), or a central processing unit (CPU), which can be integrated in a corresponding transceiver. In some embodiments, the AP 104 may operate in a 320 MHz BSS operating channel or a 160 MHz BSS operating channel that is divided into multiple subchannels. For example, the 320 MHz BSS operating channel may be divided into four 80 MHz subchannels or the 160 MHz BSS operating channel may be divided into two 80 MHz subchannels. Examples of channels within the 80 MHz subchannels may include a 20 MHz channel of a BSS and a 40 MHz channel of the BSS.

In the embodiment depicted in FIG. 1, the non-AP STAs, implemented as STA 108 and STA 110, each include a radio implemented as non-AP STAs coupled to an antenna 116, 118. In such an embodiment, the non-AP STAs 108, 110 may be implemented in hardware (e.g., circuits), software, firmware, or a combination thereof. The STAs 108, 110 may be fully or partially implemented as an IC device. In some embodiments, the non-AP STAs 108, 110 wirelessly connect to wireless APs. For example, the STA 108 may be implemented in a laptop, a desktop personal computer (PC), a mobile phone, or other communications device that supports at least one WLAN communications protocol. In some embodiments, the non-AP STA 108 is a communications device compatible with at least one IEEE 802.11 protocol (e.g., the IEEE 802.11bn protocol). In some embodiments, the STA 108 implements a common MAC data service interface and a lower layer MAC data service interface. In some embodiments, the AP 104 and/or the STA 108 identifies which communication links are a part of the BSS operating bandwidth during an operation setup phase and/or exchange information regarding capabilities during the operation setup phase. The second STA and any other STAs (not shown) may be similar. In some embodiments, each of the non-AP STAs 108, 110 may operate in one or more different frequency blocks, e.g., a 2.4 GHz frequency block, a 5 GHz frequency block, and a 6 GHz frequency block. In some embodiments, the STAs 108, 110 may operate in different subchannels of an AP's BSS operating channel, e.g., primary and non-primary subchannels. In some embodiments, each STA 108, 110 includes at least one antenna 116, 118, at least one transceiver (not shown) operably connected to the at least one antenna, and at least one controller (not shown) connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA 108 communicates with the AP 104 via a communication link 102 and the STA 110 communicates with the AP 104 via the communication link 102. In an embodiment, the communication link 102 may include a BSS operating channel established by the AP 104 that features multiple 20 MHz channels used to transmit frames (e.g., Physical Layer Protocol Data Units (PPDUs), beacons, management frames, etc.) between the AP, a first wireless device, and each STA, a second and multiple wireless devices. In some embodiments, a 20 MHz channel may be a punctured 20 MHz channel or an unpunctured 20 MHz channel. In some embodiments, the 20 MHz channels may be aggregated to form a subchannel (e.g., an 80 MHz subchannel or a 160 MHz subchannel).

The Ultra-High Reliability (UHR) 802.11bn and the EHT communication protocol (i.e., IEEE 802.11be standard) are a next generation versions of the communications protocol that will succeed the IEEE High Efficiency (HE) 802.11ax standard. Additional future versions (e.g., next-generation communication protocols) of the IEEE 802.11 communication protocol may succeed IEEE 802.11ax or IEEE 802.11be. In some embodiments, the EHT communication protocol permits a wireless device (e.g., an AP) in a BSS to establish a BSS operating channel through a BSS operation element that includes multiple 20 MHz channels aggregated together to form a subchannel (sometimes referred to as a "segment" or "channel segment"). For example, the wireless device may separate a 320 MHz BSS operating channel by aggregating every four adjacent 20 MHz channels to form an 80 MHz subchannel, or by aggregating every eight adjacent 20 MHz channels to form a 160 MHz subchannel.

In addition, a first wireless device, e.g., an AP, in the BSS may also establish the BSS operating channel with punctured 20 MHz channels and unpunctured 20 MHz channels through the BSS operation element (e.g., static channel puncture), such that the first wireless device may have a first bandwidth (e.g., 320 MHz operating channel) permitted by a wireless communication protocol (e.g., the EHT communication protocol), but in which one or more 20 MHz channels within the first bandwidth are punctured; and the first bandwidth of the first wireless device that includes the punctured operating channel may be larger than a second bandwidth (e.g., 80 MHz) of a second wireless device, e.g., a STA, that operates in the same BSS as the first wireless device. As an example, the first wireless device may establish the punctured operating channel having a first bandwidth defined by the first wireless device to be 160 MHz, but in which one 20 MHz channel within the first bandwidth of 160 MHz is punctured, according to an embodiment. As another example, the first wireless device may establish the punctured operating channel having a first bandwidth defined by the first wireless device to be 320 MHz, but in which two 20 MHz channels within the first bandwidth of 320 MHz are punctured, according to an embodiment. Furthermore, the first/second wireless device may include a primary channel (e.g., a primary 20 MHz channel) within the BSS which may be used to detect frames (e.g., PPDUs, beacons, management frames, etc.). In some embodiments, if the first/second wireless device utilizes a bandwidth wider than 20 MHz, then the first/second wireless device may detect a PPDU that has a size greater than or equal to 20 MHz via the primary 20 MHz channel.

An Access Point (AP) can allocate its BSS operating channel to multiple subchannels (e.g., each 80 MHz subchannel of a 160 MHz BSS channel, each 80 MHz subchannel of a 320 MHz BSS channel or each 160 MHz subchannel of a 320 MHz BSS channel) where each subchannel includes one backoff 20 MHz channel. The subchannel with the primary 20 MHz channel as the special backoff 20 MHz channel is the primary subchannel and a subchannel without the primary 20 MHz channel is a non-primary subchannel. In the examples herein the backoff 20 MHz channel of each of the different multiple subchannels is not punctured. If the primary subchannel is busy because of a TXOP of a neighbor BSS, the AP and its associated STAs switch to a non-primary subchannel and do frame exchanges on the non-primary subchannel after the backoff on the backoff 20 MHz channel of the non-primary 20 MHz channel. At the end of the neighbor BSS's TXOP, the AP and its associated STAs switch back to the primary subchannel to do the frame exchanges after the backoff procedure in the primary 20 MHz channel. Such a switch from one subchannel to another subchannel is a dynamic subchannel switch.

The AP or a Station (STA), i.e., a STA that is not an AP or is separate from an AP, may not be able to do medium carrier sensing (or detect a Physical Layer Protocol Data Unit (PPDU)) in one subchannel while also doing medium carrier sensing or PPDU Tx/Rx in another subchannel. The AP may have a capability to do a subchannel switch dynamically while the STAs may not support a subchannel switch dynamically. The STAs that do not support a dynamic subchannel switch may statically operate using different subchannels through a Subchannel Selective Transmission (SST) operation. Some APs can do the medium carrier sensing, if the backoff is done in the primary 20 MHz channel.

TXOP Protection is described, in part.

With multiple subchannels available and multiple backoff 20 MHz channels available, a process for indicating how many subchannels are allowed in a TXOP is useful. This is useful also where a non-primary subchannel with no primary 20 MHz channel is being used.

In one type of operation for TXOP protection, a Request to Send (RTS) message in a PPDU from the AP to a STA (or from a STA to the AP) and a responding Clear to Send (CTS) message in a PPDU from the STA (or from the AP) will cover the primary 20 MHz channel and the other 20 MHz channels of the BSS operating channel at the beginning of a TXOP. A dynamic Bandwidth (BW) negotiation may be used to allow the BW of the CTS message (i.e., the BW of the PPDU carrying the CTS) to be the same or narrower than the BW of the soliciting RTS (i.e., the BW of the PPDU carrying the RTS). For a multiple user context, a Multi-User RTS (MU-RTS) message from an AP may be used to solicit a CTS message from multiple STAs at the same time. The solicited CTS messages will each be sent in a 20 MHz channel which covers the primary 20 MHz channel.

When multiple subchannels are included by the soliciting PPDU that carries an RTS for a dynamic BW negotiation, the responding CTS with a narrower BW being available may not cover the backoff 20 Mz channel whose backoff procedure initiates the RTS transmission. The backoff 20 MHz channel being used to announce the narrower BW may be agreed to by both the STA and the AP when the soliciting RTS covers multiple backoff 20 MHz channels. When multiple subchannels are included by the soliciting PPDU that carries an MU-RTS, the MU-RTS may solicit some CTS frames that use a narrower BW than the BW used for the MU-RTS. The backoff 20 MHz channel being used to use the narrower BW for a responding CTS should be agreed to by the STA and the AP when the soliciting MU-RTS covers multiple backoff 20 MHz channels.

Figure 2A:
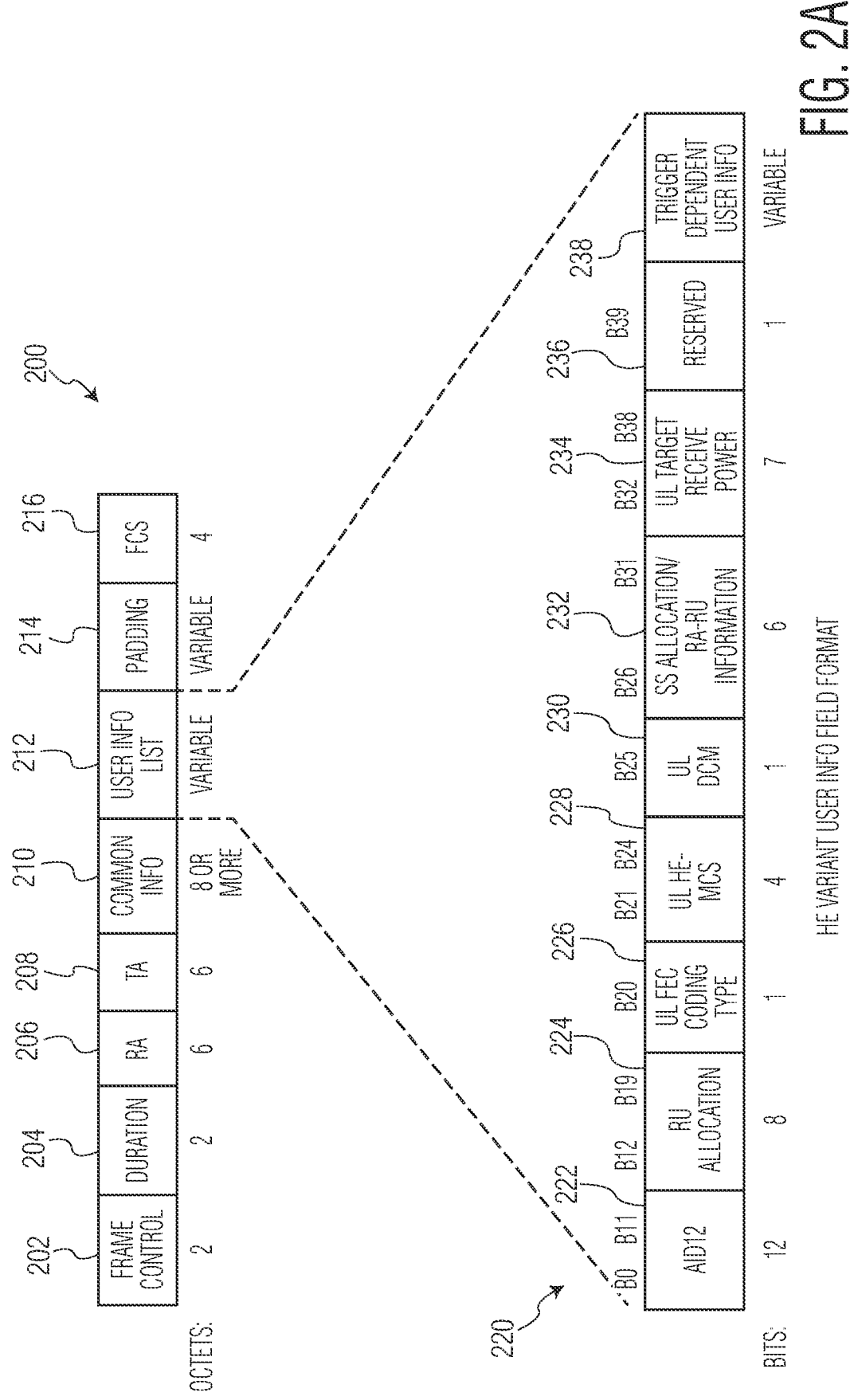
FIG. 2A depicts a Trigger Frame format suitable for transmission from an AP to a STA.
Figure 2B:
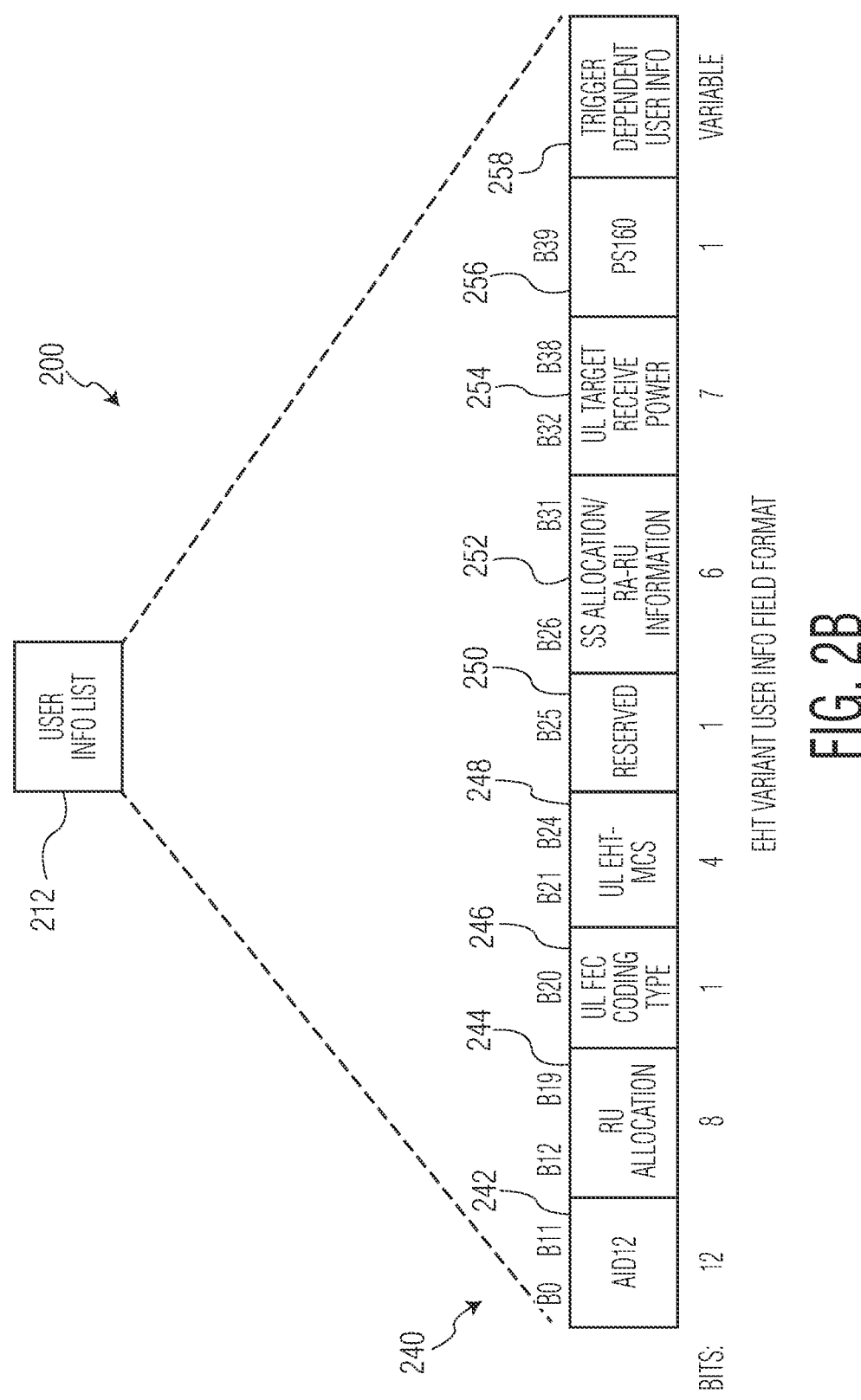
FIG. 2B depicts a second Trigger Frame format suitable for transmission from an AP to a STA.

The primary 20 MHz channel is the reference channel that is used for coding the resource unit (RU) index in the RU Allocation subfield 224 and PS 160 subfield 256 of FIG. 2B that indicate the allocated RU for an Ultra High Reliability (UHR) Trigger-Based (TB) PPDU or other types of TB PPDUs or the RU index of the RU in DownLink (DL) Extremely High Throughput (EHT) Multi-User (MU) PPDU.

As shown in FIG. 2A, a Trigger Frame 200 has a format with a Frame Control field 202, a Duration field 204, a Receiver Address (RA) field 206, a Transmitter Address (TA) field 208, a Common Information field 210, a User Information List 212, a variable amount of Padding 214, and a Frame Check Sequence (FCS) field 216 for error detection. The User Information List 212 is expanded for the High Efficiency (HE) variant 220, for the EHT variant 240 of a Trigger Frame, and for the UHR variant of a Trigger frame (not shown in the figure).

An HE mode is a part of 802.11ax on the 2.4, 5 GHz and 6 GHz bands for WiFi 6 and for WiFi 6e with no more than a 160 MHz HE PPDU bandwidth and may be expanded to other applications. The HE variant 220 includes an Association Identifier (AID) subfield 222, an RU Allocation subfield 224 of 8 bits, an Uplink (UL) Forward Error Correction (FEC) Coding Type subfield 226, a UL High Efficiency Modulation and Coding Scheme (RE-MCS) subfield 228, a UL Dual Carrier Modulation (DCM) subfield 230, and Spatial Streams (SS) Allocation/RA-RU Information subfield 232, a UL Target Receive Power subfield 234, Reserved bits 236, and a Trigger Dependent User Info subfield 238.

The RU allocation to the STA is sent from the AP to the STA in the 8 bits of the RU Allocation subfield 224 of the User Information List field 212 of the Trigger Frame 200. If the UL BW subfield indicates a 20 MHz, 40 MHz, or 80 MHz PPDU, then the first bit (B0) of the RU Allocation subfield is set to 0. If the UL BW subfield indicates 80+80 MHz or 160 MHz, then B0 of the RU Allocation subfield is set to 0 to indicate that the RU allocation applies to the primary 80 MHz channel and is set to 1 to indicate that the RU allocation applies to the secondary 80 MHz channel. When the allocated BW does not include the primary 20 MHz channel then the allocation of RU is not clear from the bits of the RU Allocation subfield 224.

An EHT mode is a part of 802.11be to provide Multi-Link Operation (MLO) on the 2.4, 5, and 6 GHz bands with no more than a 320 MHz EHT PPDU bandwidth for WiFi7 and may be expanded to other uses. EHT mode also supports Multi-Resource Unit (MRU) allocation in which an AP is able to allocate multiple resource units to a STA in the trigger frame. The MRU allocation allows for more simultaneous bandwidth to be allocated to the STA.

As shown in FIG. 2B, an EHT variant 240 of the User Info List 212 includes an Association Identifier (AID) subfield 242, an RU Allocation subfield 244 of 8 bits, an Uplink (UL) Forward Error Correction (FEC) Coding Type subfield 246, a UL EHT Modulation and Coding Scheme (MCS) subfield 248, Reserved bits 250, a Spatial Streams (SS) Allocation/RA-RU Information subfield 252, a UL Target Receive Power subfield 254, a PS 160 subfield 256 of 1 bit, and a Trigger Dependent User Info subfield 232. The RU Allocation subfield 244 and PS 160 subfield 256 are used to carry the RU index.

B0 of the RU allocation subfield 244 is set to 0 to indicate that the RU or MRU allocation applies to the primary 80 MHz channel and is set to 1 to indicate that the RU allocation applies to the secondary 80 MHZ channels in the primary 160 MHz. B0 of the RU allocation subfield is set to 1 to indicate that the RU or MRU allocation applies to the upper 80 MHz in the secondary 160 MHz. If the size of the RU or MRU allocation is smaller than or equal to 2×996 tones, then the PS 160 subfield 256 bit is set to 0 to indicate the RU or MRU allocation applies to the primary 160 MHz channel and set to 1 to indicate that the RU or MRU allocation applies to the secondary 160 MHz channel. Otherwise, the PS 160 subfield 256 is used to indicate the RU or MRU index along with the RU allocation subfield 244.

The UHR mode is similar to the EHT mode in carrying an RU index for UHR TB PPDU. Further the UHR mode may support a wider bandwidth UHR PPDU (e.g., up to a 480 MHz PPDU instead of up to a 320 MHz PPDU as in EHT mode). In one embodiment, the UHR mode may be indicated by the Special User Info field. In another embodiment, an additional bit in the User Info field (e.g., the reserved B25), RU Allocation subfield 244 and PS 160 subfield 256 are used to indicate the index of the RU, MIRU, or any other RU type (e.g., a DRU).

TXOP Bandwidth Indications are described in part.

As mentioned, a BSS operating channel can be divided into multiple subchannels. The subchannel bandwidth (BW) can be 80 MHz, 160 MHz or another width. The selected subchannel bandwidth can be announced by the AP in the Beacon Frame, a packet sent periodically to advertise the AP, and the other management frames, e.g., Probe Response Frame, Association Response Frame. A backoff 20 MHz channel can also be announced for each subchannel in the Beacon Frame, Probe Response Frame and Association Response Frame. The backoff 20 MHz channel of a subchannel is used to do the backoff when switching to the subchannel or when doing parallel backoff in multiple subchannels. These backoff 20 MHz channels are not punctured so that a STA that switches to the subchannel can start the decoding of the PPDU transmitted in the subchannel.

One of the subchannels will be the primary subchannel (Subchannel 1) and have a primary 20 MHz channel for Beacon Frames, Trigger Frames, and other management purposes. The other subchannels are the secondary, tertiary etc. subchannels, although a Broadcast Service Set (BSS) may be limited to 2 or 4 total subchannels. When, e.g., an 80 MHz subchannel in a subchannel of 160 MHz, 320 MHz etc. is not the primary subchannel and has no backoff 20 MHz channel, an unpunctured 20 MHz channel can be announced as a backoff 20 MHz channel for the 80 MHz channel.

Figures 3, 4:
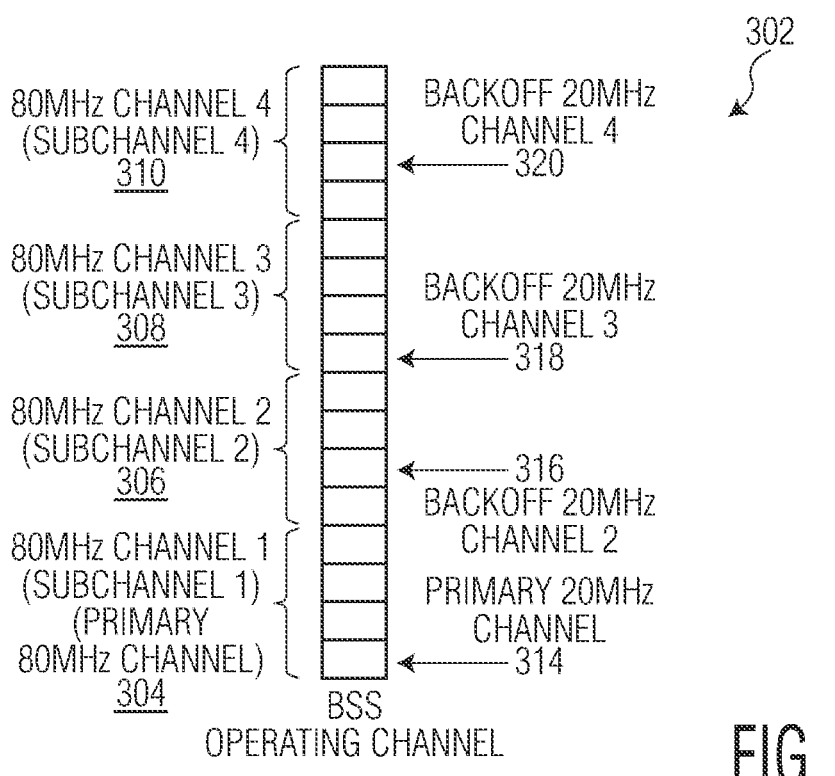
FIG. 3 depicts a 320 MHz operating channel with four subchannels and backoff channels.
FIG. 4 depicts a 320 MHz operating channel with two subchannels and a backoff channel.

In one configuration, an AP can announce more than two subchannels, i.e., one primary subchannel and more than one non-primary subchannel. FIG. 3 shows an example BSS operation channel 302 with a total 320 MHz BW that is divided into four subchannels of 80 MHz each. A first subchannel 304 is the primary subchannel and includes the primary 20 MHz channel 314 which may be used as the backoff 20 MHz channel among other purposes. A second subchannel 306 has an assigned 20 MHz second backoff 20 MHz channel 316. A third subchannel 308 has an assigned third backoff 20 MHz channel 318, and a fourth subchannel 310 has an assigned fourth backoff 20 MHz channel 320. Each 80 MHz subchannel has four 20 MHz portions and any one of these portions may be assigned as the backoff 20 MHz channel in the Beacon frame and in other messages from an AP.

In one configuration, an AP can announce at most two subchannels, i.e., one primary subchannel and one non-primary subchannel. One example is that one BSS with 160 MHz can have two subchannels, one primary subchannel with 80 MHz bandwidth (BW) and one non-primary subchannel with 80 MHz BW. Another configuration is that one BSS with 320 MHz can have two subchannels, one primary subchannel with 160 MHz BW and one non-primary subchannel with 160 MHz BW. With each AP announcing at most two subchannels, the dynamic subchannel switch becomes simple compared with allowing an AP to announce more than two subchannels. FIG. 4 shows an example BSS operation channel 402 with a total 320 MHz BW that is divided into two subchannels of 160 MHz each. A first subchannel 404 is the primary subchannel and includes the primary 20 MHz channel 414 which may be used as the backoff 20 MHz channel among other purposes. A second subchannel 406 has an assigned 20 MHz second backoff 20 MHz channel 416. Each 160 MHz subchannel has eight 20 MHz portions and any one of these portions may be assigned as the backoff 20 MHz channel in the Beacon frame and in other messages from an AP. One configuration is that one BSS with 480 MHz can have two subchannels, one subchannel with 240 MHz BW and another subchannel with 240 MHz BW, or one subchannel with 320 MHz BW and another subchannel with 160 MHz BW. Channels of different sizes may be subdivided into subchannels of equal or different sizes, typically, but not necessarily in multiples of 80 MHz.

In some embodiments, the TXOP BW is less than a single subchannel without covering a primary 20 MHz channel and other 20 MHz channels in the primary subchannel. In some embodiments, if a TXOP is acquired by the backoff in a backoff 20 MHz channel of a non-primary subchannel, the TXOP does not use any 20 MHz channel of the primary subchannel and does not use any 20 MHz channel of other non-primary subchannels.

In some implementations, a Transmit Opportunity (TXOP) may be configured to use less BW than a full single subchannel or the full single subchannel if the subchannel does not cover the primary 20 MHz channel and the other 20 MHz channels of the primary subchannel. In such implementations, when a backoff is done in a subchannel that does not include the primary 20 MHz channel, the widest BW of a Transmit Opportunity (TXOP) PPDU is the BW of the subchannel in which the backoff is done. The BW may be configured to be even less than the full single subchannel. Such a TXOP may be protected using RTS or MU-RTS to solicit a CTS in all or part of a subchannel. In some configurations, there may be only one subchannel that does not cover the primary 20 MHz channel in the BSS, i.e., the BSS has a primary subchannel and a secondary subchannel. This allows the backoff messages to be received by limiting the BSS to a single backoff 20 MHz channel in the secondary subchannel that is not the primary 20 MHz channel in the primary subchannel. With such a restriction, the dynamic BW negotiation through an RTS/CTS exchange in a non-primary subchannel is simple. In some configurations with a single non-primary subchannel, when the primary subchannel is busy because of a TXOP at a neighbor BSS, the AP and its associated STAs have a greater chance to simultaneously switch to the same subchannel. A successful RTS/CTS or MU-RTS/CTS handshake means that both the TXOP holder and the TXOP responder(s), e.g., an AP and STA(s), successfully switch to the same subchannel to do the frame exchanges in the TXOP. This is shown in FIG. 4 as backoff 20 MHz channel 416 in the secondary subchannel 406 (subchannel 2).

A Request-to-Send (RTS) or Multi-User Request-to-Send (MU-RTS) may be sent by a STA to an AP in a whole subchannel or part of a subchannel that covers the backoff 20 MHz channel of the subchannel, where the subchannel has no primary 20 MHz channel. The RTS or MU-RTS may be sent to solicit a Clear-to-Send (CTS). The solicited CTS provides the protection or the BW negotiation for the TXOP. The TXOP responder may send the CTS in response to the RTS or MU-RTS and using a channel that covers the backoff 20 MHz channel of the subchannel. In this way, the CTS may be used by the TXOP responder to indicate that all or part of the subchannel that includes the backoff 20 MHz channel is clear for use by the requester for the next TXOP.

Similarly, when the RTS or MU-RTS is sent by a STA or an AP in a PPDU in one or multiple subchannels that covers the primary 20 MHz channel, the TXOP responder may respond by sending a CTS in one or multiple subchannels that covers the primary 20 MHz channel. The initiated TXOP can cover the subchannel that has the primary 20 MHz channel and can cover one or more additional subchannels. The BW of the PPDU that carries the CTS has the same BW of the PPDU that carries RTS, or the BW of the PPDU that carries the CTS is narrower than the BW of the PPDU that carries RTS where the CTS's PPDU covers the primary 20 MHz channel.

The (MU-) RTS is used for TXOP protection or to decide whether the peer device is in the subchannel for a dynamic subchannel switch. In such case, the AP and STAs switch to a non-primary subchannel when the primary subchannel is busy. The AP and the STA do the frame exchanges in the non-primary subchannel until the end of the OBSS's TXOP, i.e., the AP and STAs switch back to the primary subchannel when the primary subchannel becomes idle again.

In some embodiments a TXOP BW is more than a single subchannel without covering a primary 20 MHz channel In some implementations, a Transmit Opportunity (TXOP) may be configured to use more BW than a full single subchannel that does not cover the primary 20 MHz channel, i.e., a non-primary subchannel. In such an implementation after the backoff procedure in the backoff 20 MHz channel of a non-primary subchannel becomes 0, the TXOP may be initiated by sending an RTS from a STA to the AP in more than one non-primary subchannel so that the widest BW of the TXOP is more than the BW of a single subchannel. In such implementations, the TXOP BW may still be configured to satisfy any channelization requirement. As an example, in the case of four contiguous 80 MHz subchannels of a 320 MHz channel, as shown in FIG. 3, if the backoff procedure in the backoff 20 MHz channel of a third subchannel becomes 0 and all the 20 MHz channels of the third subchannel and the fourth subchannel are idle for one Point Coordination Function (PCF) Interframe space (PIFS) before the initial RTS transmission is idle, the third subchannel 308 (subchannel 3) is combined with a contiguous higher indexed subchannel, the fourth subchannel 310 (subchannel 4) providing for a 160 MHz available BW using the two subchannels. The 160 MHz TXOP can be protected by sending the RTS in the subchannel 3, subchannel 4. If the backoff procedure in the backoff 20 MHz channel of a second subchannel becomes 0 and all the 20 MHz channels of the second subchannel, third subchannel and the fourth subchannel are idle PIFS before the initial RTS transmission are idle, the second subchannel is combined with the third subchannel 308 (subchannel 3) and the fourth subchannel 310 (subchannel 4) providing for a 240 MHz available BW using the three subchannels. The 240 MHz TXOP can be protected by sending the RTS in the second subchannel 306 (subchannel 2), the third subchannel 318, or the fourth subchannel 320.

The STA may send an RTS or MU-RTS to an AP in a backoff 20 MHz channel of a subchannel that does not include a primary 20 MHz channel, i.e., a subchannel other than the primary subchannel. The AP may send the CTS solicited by the STA using a channel that does not cover the backoff 20 MHz channel, even when the RTS was sent in a channel that covers the backoff 20 MHz channel. In order to avoid such behavior, in some implementation, the different priority can be announced by the AP, and the backoff 20 MHz channel being used for the backoff has the highest priority among the combined subchannels. When a narrower BW is used by the responding CTS, the backoff 20 MHz channel with highest priority among the combined subchannels for MU-RTS or RTS is used by the CTS.

RU Allocation indication are described in the Trigger Frame in part.

An RU allocation may be indicated in the DL MU PPDU for multiple STAs or the Trigger Frame for soliciting the TB PPDU in UL transmission of multiple STAs, e.g., Trigger Frame 200 of FIG. 2. Some examples are described above. However, the RU index coding currently used cannot be used when the bandwidth of the RU allocation is greater than one subchannel and not in the primary subchannel. Given that multiple backoff 20 MHz channels exist in this case and the standard RU index coding is based on the unique primary 20 MHz channel, the alternatives to the RU index coding of the standard Trigger Frame and DL MU PPDU may be used. These alternatives may be used for a MU-RTS, a basic Trigger Frame or another Trigger frame that does not cover the primary 20 MHz channel but that solicits CTS or a TB PPDU respectively.

In one embodiment, in a BSS with multiple non-primary subchannels (e.g., a 320 MHz BSS with three 80 MHz non-primary subchannels besides one primary 80 MHz subchannel), different priorities are given to the different backoff 20 MHz channels on the different non-primary subchannels. Such priorities of the different backoff 20 MHz channels are announced by the AP to its associated STAs. When a Trigger frame that is transmitted in multiple non-primary subchannels allocates RUs, the RU index coding is based on the backoff 20 MHz channel with highest priority. In one configuration a 320 MHz BSS with four 80 MHz subchannels and a secondary 160 MHz channel, with two 80 MHz subchannels, does not include a primary 20 MHz channel within the secondary channel. To accommodate the larger bandwidth allocation in a Trigger Frame, a backoff 20 MHz channel within the secondary subchannel is defined as a dummy primary 20 MHz channel. The dummy primary 20 MHz channel is a backoff 20 MHz channel with higher priority than another backoff 20 MHz channel. The dummy primary 20 MHz channel is used as if it is the primary 20 MHz channel when doing RU index coding for RU allocation for the secondary 160 MHz channel. The same field coding is used for the RU Allocation field of the Trigger Frame but the Trigger frame covers the dummy primary 20 MHz channel of the secondary 160 MHz channel. In the DL MU PPDU with multiple RUs with two non-primary subchannels in a secondary 160 MHz channel, the RU index coding is based on the dummy primary 20 MHz channel.

In another example, the field coding may be used for a Trigger Frame that covers the secondary 160 MHz channel (two non-primary subchannels) combined with a secondary 80 MHz channel (the additional subchannel), to form a 240 MHz channel (three non-primary subchannels). In such an example, one configuration is that the backoff 20 MHz channel with highest priority among the three non-primary subchannels is used as the reference to allocate RU indexes to various RUs. In another embodiment, since the 240 MHz BW is actually the 320 MHz BW with a primary 80 MHz channel being punctured, the primary 20 MHz channel may be used as the reference to allocate the RU indexes to various RUs in the three non-primary subchannels.

In one configuration, a BSS cannot have more than two subchannels. One subchannel, the primary subchannel, has the primary 20 MHz channel and the other subchannel, the non-primary 20 MHz channel, has the backoff 20 MHz channel that is not the primary 20 MHz channel. The AP announces the subchannels and the backoff 20 MHz channel of the non-primary subchannel. The Trigger frame in a non-HT duplicate PPDU or UHR PPDU that does not cover the primary 20 MHz channel can be in a BW that is covered by the non-primary subchannel only, i.e., the BW covered by the Trigger frame is not more than the BW of the subchannel. The DL MU PPDU that does not cover the primary 20 MHz channel can be in a BW that is covered by the non-primary subchannel only. In one configuration, a 320 MHz channel in the BSS has two 160 MHz subchannels, as shown e.g., in FIG. 4. Each subchannel has a backoff 20 MHz channel defined for each subchannel. In some configuration, the BSS is allowed only two subchannels, so the total bandwidth of the BSS is the 320 MHz channel. The backoff 20 MHz channel of the second subchannel (subchannel 2) may be treated as the primary 20 MHz channel, i.e., the reference 20 MHz channel, when doing the RU Allocation field coding for the Trigger Frame and when doing RU index coding for DL MU PPDU. When a Trigger Frame does not cover the primary 20 MHz channel, the Trigger Frame can only allocate the RUs of solicited TB PPDU in a BW no more than the BW of the non-primary subchannel, e.g., the secondary 160 MHz channel. When a DL MU PPDU does not cover the primary 20 MHz channel, the DL MU PPDU is no more than the subchannel BW and can only allocate the RUs in a BW that is all or part of the non-primary subchannel that is the secondary 160 MHz channel.

In one configuration, a BSS with 160 MHz BW has two subchannels where one subchannel, e.g., the primary 80 MHz channel, has the primary 20 MHz channel and another subchannel, e.g., the secondary 80 MHz channel, has a backoff 20 MHz channel. The Trigger Frame in a non-HT duplicate PPDU or UHR PPDU that does not cover the primary 20 MHz channel can be in a BW that is covered by the non-primary subchannel only (secondary 80 MHz channel), e.g., the BW covered by the Trigger frame is not more than the BW (80 MHz) of the subchannel. The DL MU PPDU that does not cover the primary 20 MHz channel can be in a BW (e.g., 80 MHz) that is covered by the non-primary subchannel only.

In one embodiment, the backoff 20 MHz channel of the secondary subchannel is not used for RU allocation, not as the RU allocation reference, but is defined as the channel where the backoff is done in a subchannel and is not punctured. The primary 20 MHz channel of the primary subchannel and the BSS operating BW may be used for the RU allocation field coding e.g., the coding of RU Allocation field and PS 160 field. As an example, the RU allocation indication is based on the BSS operating BW, the RU location, and the RU width in the corresponding Trigger Frame. One example is that in a 320 MHz BSS in which each subchannel has an 80 MHz BW, the Trigger Frame in a subchannel of a secondary 160 MHz channel, e.g., the fourth subchannel, the RU index of the RU has a PS 160 field to indicate the secondary 160 MHz, RU Allocation field to indicate the RU size and the location in the related 80 MHz channel of the fourth subchannel. Another example is that in a 320 MHz BSS in which each subchannel has a 160 MHz BW, the Trigger Frame in a subchannel of the secondary 160 MHz channel, i.e., a non-primary subchannel, the RU index of the RU has a PS 160 field to indicate a secondary 160 MHz, RU Allocation field to indicate the RU size and the location in the secondary 160 MHz channel of the non-primary subchannel.

More specifically, as an example, in a 160 MHz BSS, there is a primary 80 MHz subchannel with a primary 20 MHz channel and a secondary 80 MHz subchannel. An 80 MHz Trigger Frame that allocates the RU in the secondary subchannel has B0 of the RU Allocation subfield set to 1.

An AP selects Backoff Channels

An AP can select the backoff 20 MHz channels for one or more subchannels of a BSS and then provide that selection to all of its associated STAs. When multiple subchannels are used, as shown e.g., in FIGS. 3 and 4, a backoff 20 MHz channel may be provided for each subchannel. As mentioned above, the channels may have different bandwidths and the subchannels may be based on different divisions of a channel. Subchannels are typically 80 MHz, or 160 MHz but other bandwidths may be used instead. In the examples below, the described messages, actions, etc. may also be performed or sent by a STA. In some instances, the described messages, actions, etc. do not apply to a STA. In such an example, a STA does backoff in the primary 20 MHz channel. When a STA parks in a subchannel other than the primary subchannel, i.e., a non-primary subchannel, or dynamically switches to a non-primary subchannel such that the subchannel does not cover the primary 20 MHz channel, then the STA will not do backoff. The STA will resume backoff on the primary 20 MHz channel after it is no longer parked in a secondary, tertiary, or other subchannel.

When the AP selects the backoff 20 MHz channels, the selected backoff 20 MHz channels may be announced in any AP Management frame, e.g., Beacon Frame, Probe Response, Association Response, etc. The AP may select one of the announced backoff 20 MHz channels to do the backoff if the current backoff 20 MHz channel is not suitable for the backoff for any reason.

In order to explicitly announce the backoff 20 MHz channel selection. the AP may transmit a Beacon Frame through the primary 20 MHz channel. In addition, or as an alternative, the backoff 20 MHz channel selection may be announced in a Beacon Frame through a selected backoff 20 MHz channel.

Processing of a missed PPDU from a STA is described in part.

When an AP uses a backoff 20 MHz channel other than the primary 20 MHz channel to do the backoff, the AP may not be able to obtain channel information sent in a PPDU of a STA in the primary 20 MHz channel. When the AP is using a backoff 20 MHz channel, it may not be able to receive PPDUs from a STA in the primary 20 MHz channel.

To reduce the use of a backoff 20 MHz channel, the AP may use the primary 20 MHz channel when available. In some examples, the primary 20 MHz channel is determined to be unavailable when the Network Allocation Vector (NAV) timer that is set by an Overlapped Basic Service Set (OBSS) frame received in the primary 20 MHz channel is not 0 or the Physical (PHY) Clear Channel Assessment (CCA) detects the OBSS PPDU in the primary 20 MHz channel The AP may switch back from the non-primary 20 MHz channel to the primary 20 MHz channel for the backoff procedure before the TXOP of the OBSS in the primary 20 MHz channel is idle (e.g., before the NAV timer expires).

In the case of STAs that are not AP's, a backoff may not be permitted other than in the primary 20 MHz channel. A STA may be restricted by the AP to not do the backoff, e.g., through an (MU) Enhanced Distributed Channel Access (EDCA) procedure, or through another procedure.

A TXOP Bandwidth Decision is described in part.

When an AP's backoff counter in the primary 20 MHz channel, or a backoff 20 MHz channel other than primary 20 MHz channel, becomes 0, the AP may select one of the other backoff 20 MHz channels for a TXOP. As mentioned above, in each case the selected 20 MHz channel may not be punctured at least while being used for this backoff process and TXOP.

If the medium in another backoff 20 MHz channel is idle for one Point Coordination Function (PCF) Interframe space (PIFS) before the TXOP and the channel state information (NAV timer), when available, indicates that the medium is idle, then the 20 MHz channel can be selected. In some examples, if the medium is idle for on PIFS before the TXOP and there is no available state information, the channel can also be selected. Alternatively, the state information is necessary and the backoff 20 MHz channel cannot be selected unless state information is also available and it indicates that the medium is idle.

In some examples, a 20 MHz channel that is not a backoff 20 MHz channel and is not the primary 20 MHz channel may be selected. When the 20 MHz channel is idle for one PIFS before the TXOP and the selection of the 20 MHz channel also satisfies the channel puncture requirement, the 20 MHz channel can be selected.

An AP's Parallel Backoff is described in part.

Having selected a primary 20 MHz channel, backoff 20 MHz channels, or other 20 MHz channels, the AP can do the backoff in multiple backoff 20 MHz channels. In an example, each backoff 20 MHz channel has the full Enhanced Distributed Channel Access (EDCA) backoff procedure (CW, QSRC, backoff counter for each Access Category (AC)). In another example, the full EDCA backoff procedure (CW, QSRC, backoff counter for each AC) is acquired after collecting the backoff of all the selected multiple backoff 20 MHz channels together.

When the AP is doing backoff for sending frames on multiple 20 MHz channels, a backoff counter in any one 20 MHz channel can be decreased by 1 if either one of the following conditions are true:

The medium in the 20 MHz channel is idle (both PHY CCA and virtual carrier sensing), e.g., being idle for an Arbitration Interframe Space (AIFS) plus one slot after changing from busy to idle or being idle for one slot after the backoff counter is counted down by 1.

The AP is not the TXOP holder or TXOP responder through the other 20 MHz channel(s), i.e., the AP does not use the other 20 MHz channel(s) to transmit the frame or receive the frame addressed to it.

When an AP initiates a TXOP through a backoff 20 MHz channel of a subchannel, the backoff counters of any backoff 20 MHz channels of other subchannels of the BSS, which may include the primary 20 MHz channel, are suspended until the end of the TXOP.

When the BW of the initiated TXOP covers part of the BSS operating channel (e.g., 80 MHz TXOP in a 320 MHz BSS) and at least one backoff 20 MHz channel (e.g., the primary 20 MHz channel) is not covered by the PPDUs of TXOP, the channel loses the medium status at the end of the TXOP for the uncovered backoff 20 MHz channel.

The backoff counters of the backoff 20 MHz channel that are suspended at the end of the TXOP may resume until either a PPDU is detected or the mediumSyncDelay time is passed. Before the timer for mediumSyncDelay time becomes 0, the backoff per −72 dbm and the transmission of (MU-RTS) RTS may be allowed, e.g., by using the medium recovery defined in 802.11be. In one implementation, such medium recovery is only applied to non-primary subchannels. In another implementation, such medium recovery is applied to both non-primary subchannels and primary subchannels.

When the backoff counters of multiple backoff 20 MHz channels become 0 at the same time and such backoff counters belong to different ACs, the backoff counter with a highest AC priority will initiate a TXOP.

In another embodiment, when the backoff counters of multiple backoff 20 MHz channels become 0 at the same time and such backoff 20 MHz channels have different priorities, the backoff counter in the backoff 20 MHz channel with the highest priority will initiate a TXOP.

When the backoff counters of multiple backoff 20 MHz channels become 0 at the same time and multiple backoff counters have the same highest priority AC, the one backoff counter with highest AC priority will initiate a TXOP on the corresponding backoff 20 MHz channel.

The related Contention Windows (CWs) of the other backoff counters with value 0 are doubled and the other backoff counters with value 0 are set to new values in accordance with the updated CWs for the corresponding backoff 20 MHz channel.

Parking Channels may be assigned to a STA.

In some circumstances, a STA is parked on the primary subchannel of a BSS operating channel and monitors the primary 20 MHz channel for PPDUs. In other circumstances, the STA is parked on a secondary, or other subchannel of the BSS operating channel and not the primary subchannel. The subchannel on which the STA is parked does not cover the primary 20 MHz channel. The parking subchannel may change through a negotiation with the AP or in other ways. This allows for more STAs to be active by allocating traffic to the other subchannels.

Through the negotiation, the STA can announce a 20 MHz channel from which the STA starts its decoding of any received PPDU. The negotiation can be done e.g., through a (re)Association Request/Response or new Action Frames. The parking subchannel and the 20 MHz channel from which to start the decoding of the received PPDU of a STA may be applied after the STA does the negotiation with the associated AP.

The parking subchannel and the 20 MHz channel from which to start the decoding of the received PPDU may be applied to the negotiated Target Wake Time (TWT) Service Periods (SPs) only, e.g., through TWT SST.

Figure 5:
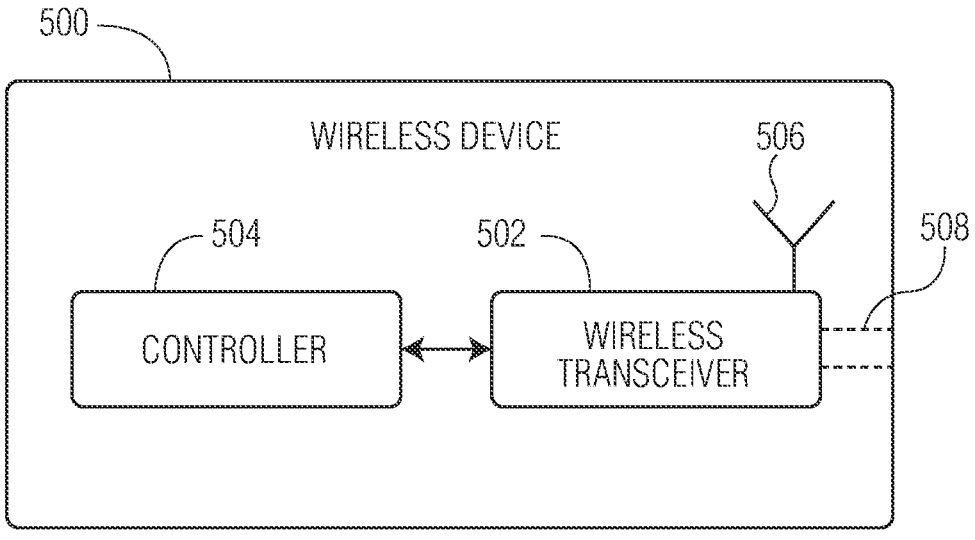
FIG. 5 depicts a wireless device in accordance with an embodiment of the invention.
Figure 7:
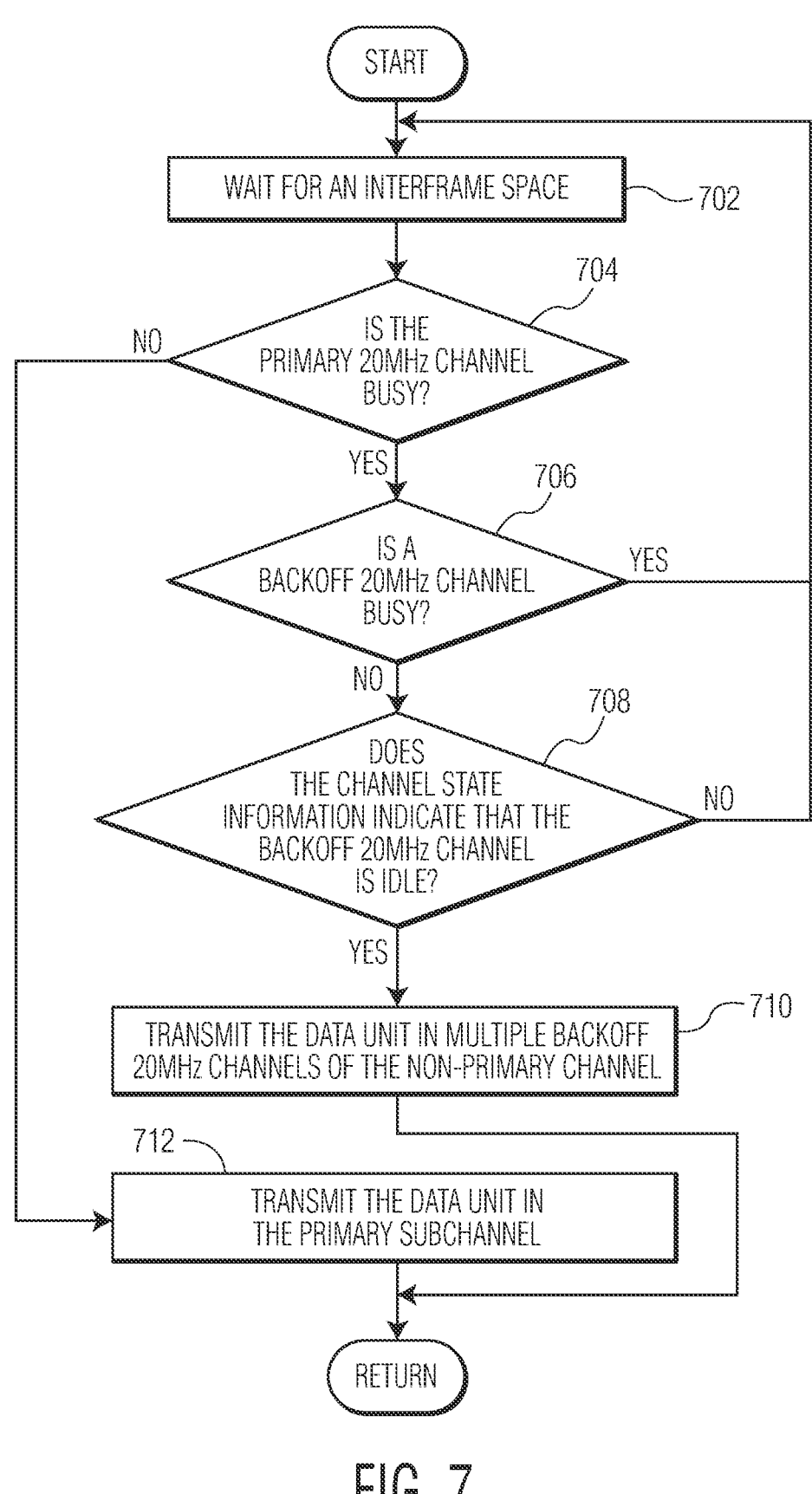
FIG. 7 is a process flow diagram of a method for wireless communication in accordance with an embodiment of the invention.

The particular 20 MHz channel from which to start the decoding may be the assigned backoff 20 MHz channel of the parking subchannel. Alternatively, a backoff 20 MHz channel may be assigned for this use. In some examples, the backoff 20 MHz channel is not covered by the parking subchannel. In some examples, a backoff 20 MHz channel may be used even when the STA is parked on the primary subchannel. In an embodiment, the wireless transceiver of a STA is configured to send a message to a second wireless
device to park in a non-primary subchannel. The BSS may
include more than one non-primary subchannel. The
assigned parking channel for the second wireless device
includes a backoff 20 MHz channel of a non-primary sub
channel. The STA's parking channel (e.g., a 40 MHz STA)
may be narrower than the parked subchannel (e.g., an 80
MHz subchannel). In this case, one of the two STA's 20
MHz channels may be the backoff 20 MHz channel of the
subchannel
FIG. 5 depicts a wireless device 500 in accordance with
an embodiment of the invention. The wireless device 500
can be used in the wireless communications system 100
depicted in FIG. 1. For example, the wireless device 500
may be an embodiment of the STA 108, the STA 110, or the
AP 104. In the embodiment depicted in FIG. 5, the wireless
device 500 includes a wireless transceiver 502, a controller
504 operably connected to the wireless transceiver, and at
least one antenna 506 operably connected to the wireless
transceiver. In some embodiments, the wireless device 500 may include at least one optional network port 508 operably
connected to the wireless transceiver. In some embodiments,
the wireless transceiver includes a physical layer (PHY)
device. The wireless transceiver may be any suitable type of
wireless transceiver. For example, the wireless transceiver
may be a LAN transceiver (e.g., a transceiver compatible
with an IEEE 802.11 protocol). In some embodiments, the
wireless device 500 includes multiple transceivers. The
controller may be configured to control the wireless trans-
ceiver to process packets received through the antenna
and/or the network port and/or to generate outgoing packets
to be transmitted through the antenna and/or the network
port. In some embodiments, the controller is implemented
within a processor, such as a microcontroller, a host proces-
sor, a host, a DSP, or a CPU. The antenna may be any
suitable type of antenna. For example, the antenna may be
an induction type antenna such as a loop antenna or any
other suitable type of induction type antenna. However, the
antenna is not limited to an induction type antenna. The
network port may be any suitable type of port. In some embodiments, the wireless device is compatible with an
Institute of Electrical and Electronics Engineers (IEEE)
802.11 protocol. In some embodiments, the wireless device
is compatible with an Institute of Electrical and Electronics
Engineers (IEEE) 802.11be protocol.
FIG. 6 is a process flow diagram of a method for wireless
communications in accordance with an embodiment of the
invention. At block 602, at a first wireless device, backoff 20
MHz channels of an operating channel BW of a BSS are
selected. The selection may be made by an AP and may
include two subchannels, a primary, and a non-primary, four
subchannels, a primary and three non-primary, or another
number of subchannels. At block 604 the operating channel
BW of the BSS for use in communicating between the first
wireless device and a second wireless device are announced
to the second wireless device. The announcement may
include subchannels of the operating channel bandwidth,
and backoff 20 MHz channels of each subchannel, wherein
one subchannel is a primary subchannel and one subchannel
is a non-primary subchannel. The primary channel may be
used for management frames and action frames, inter alia,
including Beacon Frames and Trigger Frames. The
announcement may be using a management frame. The
management frame may be at least one of a Beacon Frame,
a Probe Response Frame, and an Association Response
Frame. The Beacon Frame may be in a backoff 20 MHz
channel of the non-primary subchannel. At block 606, a data unit is transmitted to the second wireless device in a backoff
20 MHz channel of the non-primary subchannel. The first
wireless device and/or the second wireless device may be
the same as or similar to the AP 104 and the STAs 108, 110
of FIG. 1 and the wireless device 500 of FIG. 5.
    At 608, a station either the first wireless device or the
second wireless device starts a transmit opportunity for data
unit exchanges with the second wireless device after a
backoff counter reaches zero. At 610, the station suspends
backoff counters of the primary 20 MHz channel until after
the transmit opportunity.
    FIG. 7 is a process flow diagram of a method for wireless
communications in accordance with an embodiment of the
invention. At block 702 a station waits for an interframe
space, e.g., a PIFS, an AIFS, a Distributed Interframe Space
(DIFS), etc. If the primary 20 MHz channel is not busy at
704, then the STA transmits a data unit, e.g., a PPDU in the
primary subchannel at 712. The PPDU may use the entire
subchannel, just the primary 20 MHz channel, or another
part of the primary subchannel. The process then returns to
702. If the primary 20 MHz channel is busy at 702, then the
STA determines if the medium in another backoff 20 MHz
channel is idle for one PIFS before the TXOP at 706.
    If another backoff 20 MHz channel is idle at 706 then the
channel state information, e.g., a NAV timer, when avail-
able, is checked at 708. If this indicates that the medium is
idle, then the backoff 20 MHz channel can be selected. In
response to this selection, at 710, the data unit, e.g., a PPDU,
is transmitted in multiple backoff 20 MHz channels of the
non-primary channel or in one or more non-primary sub-
channels associated with the backoff 20 MHz channel. The
process then returns to 702. In some examples, if the
medium is idle for one PIFS before the TXOP and there is
no available state information, the channel can also be
selected at 708 and the data unit can be transmitted at 710.
If the backoff 20 MHz channel is busy or if the channel state
information indicates that the backoff 20 MHz channel is not
idle, then the process returns to 702 to wait for another time
period.
    The process of FIG. 7 may be performed in multiple
backoff 20 MHz channels. The backoff counter may be
independent for each backoff 20 MHz channel or they may
be consolidated. A backoff counter in any one backoff 20
MHz channel can be decreased when the corresponding
medium is idle or the STA is not using the other backoff 20
MHz channels.
    Although the operations of the method(s) herein are
shown and described in a particular order, the order of the
operations of each method may be altered so that certain
operations may be performed in an inverse order or so that
certain operations may be performed, at least in part, con-
currently with other operations. In another embodiment,
instructions or sub-operations of distinct operations may be
implemented in an intermittent and/or alternating manner.
    It should also be noted that at least some of the operations
for the methods described herein may be implemented using
software instructions stored on a computer useable storage
medium for execution by a computer. As an example, an
embodiment of a computer program product includes a
computer useable storage medium to store a computer
readable program.
    The computer-useable or computer-readable storage
medium can be an electronic, magnetic, optical, electromag-
netic, infrared, or semiconductor system (or apparatus or
device). Examples of non-transitory computer-useable and
computer-readable storage media include a semiconductor
or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A wireless device comprising
a controller to select backoff channels of an operating channel bandwidth (BW) of a Basic Service Set (BSS); and
a wireless transceiver configured to announce to a second wireless device the operating channel BW of the BSS for use in communicating between the wireless device and the second wireless device, subchannels of the operating channel bandwidth, and backoff channels of each subchannel,
wherein one subchannel is a primary subchannel and one subchannel is a non-primary subchannel,
wherein the wireless transceiver is configured to transmit a data unit to the second wireless device in a backoff channel of the non-primary subchannel; and
wherein the wireless device is an access point (AP) and the second wireless device is a non-AP device.

2. The wireless device of claim 1,
wherein the wireless transceiver is configured to announce using a management frame.

3. The wireless device of claim 1,
wherein the management frame is at least one of a Beacon Frame, a Probe Response Frame, and an Association Response Frame.

4. The wireless device of claim 3,
wherein the Beacon Frame is in a backoff 20 MHz channel of the non-primary subchannel.

5. The wireless device of claim 1,
wherein the wireless transceiver is configured to start a transmit opportunity for data unit exchanges with the second wireless device after a backoff counter reaches zero.

6. The wireless device of claim 5,
wherein the controller is configured to suspend backoff counters of the primary channel until after the transmit opportunity.

7. The wireless device of claim 1,
wherein the wireless transceiver is configured
to send a request to send message in the non-primary subchannel including a backoff 20 MHz channel of the non-primary subchannel, to receive a clear to send message in the backoff 20 MHz channel, and
to send a data unit having a bandwidth within the non-primary subchannel.

8. The wireless device of claim 1,
wherein the wireless transceiver is configured
to send a multi-user request to send message in the non-primary subchannel including a backoff 20 MHz channel of the non-primary subchannel to multiple wireless devices, to receive a clear to send message in the backoff 20 MHz channel from multiple users, and
to send a data unit having a bandwidth within the non-primary subchannel.

9. The wireless device of claim 1,
wherein the wireless transceiver is configured
to send a request to send message in the backoff channel of the non-primary subchannel,
to receive a clear to send message in the non-primary subchannel, and
to send a data unit having a bandwidth greater than the non-primary subchannel.

10. The wireless device of claim 1,
wherein the wireless transceiver is configured
to detect whether the primary channel is busy and
to transmit the data unit in the backoff channel of the non-primary subchannel in response to the primary channel being busy.

11. The wireless device of claim 10,
wherein the detecting whether the primarychannel is busy includes
waiting for an interframe space and
determining that channel state information indicates that the backoff channel is idle.

12. The wireless device of claim 1,
wherein the wireless transceiver is configured to transmit the data unit in multiple backoff channels of the non-primary channel.

13. The wireless device of claim 1,
wherein the wireless transceiver is configured to send a message to the second wireless device to park in the non-primary subchannel that includes the backoff channel.

14. The wireless device of claim 13,
wherein the wireless transceiver is configured to assign the backoff channel as a dummy primary channel for use as a primary channel in the non-primary subchannel by the second wireless device.

15. The wireless device of claim 13,
wherein the wireless transceiver is configured to send a data unit in the non-primary subchannel in response to sending the message to park in the non-primary subchannel.

16. The wireless device of claim 1,
wherein the controller is configured to allocate resource units to the second wireless device in the non-primary subchannel and
wherein the wireless transceiver is configured to assign resource units.

17. The wireless device of claim 16,
wherein the resource units are assigned by sending a Trigger Frame.

18. A wireless device comprising
a controller to store backoff channels of an operating channel BW of a BSS announced by a second wireless device; and
a wireless transceiver configured to receive an announcement from the second wireless device of the operating channel BW of the BSS for use in communicating between the wireless device and the second wireless device, subchannels of the operating channel bandwidth, and backoff channels of each subchannel,
wherein one subchannel is a primary subchannel and one subchannel is a non-primary subchannel,
wherein the wireless transceiver is configured to transmit a data unit to the second wireless device in a backoff channel of the non-primary subchannel; and wherein the wireless device is a non-access point (AP) device and the second wireless device is an AP device.

19. A method comprising:

selecting, by a first wireless device, backoff channels of an operating channel bandwidth (BW) of a Basic Service Set (BSS);

announcing by the first wireless device to a second wireless device the operating channel BW of the BSS for use in communicating between the wireless device and the second wireless device, subchannels of the operating channel bandwidth, and backoff channels of each subchannel, wherein one subchannel is a primary subchannel and one subchannel is a non-primary subchannel;

transmitting by the first wireless device a data unit to the second wireless device in a backoff channel of the non-primary subchannel; and wherein the first wireless device is an access point (AP) and the second wireless device is a non-AP device.

\* \* \* \* \*